United States Patent [19]
Vulliet

[11] Patent Number: 6,161,579
[45] Date of Patent: Dec. 19, 2000

[54] CONNECTOR SYSTEM

[75] Inventor: François Vulliet, Allinges, France

[73] Assignee: Interlemo Holding S.A., Switzerland

[21] Appl. No.: 09/474,289

[22] Filed: Dec. 29, 1999

[51] Int. Cl.[7] ..................................... F16L 37/28
[52] U.S. Cl. ................................ 137/614.05; 137/614.04
[58] Field of Search ........................ 137/614.05, 614.04, 137/614.03

[56] References Cited

U.S. PATENT DOCUMENTS

| 3,918,485 | 11/1975 | Weber et al. . | |
| 4,200,121 | 4/1980 | Walter et al. | 137/614.05 |
| 5,255,699 | 10/1993 | Herzan et al. | 137/614.05 X |
| 5,586,748 | 12/1996 | Kish | 137/614.05 X |

FOREIGN PATENT DOCUMENTS

| 0 172 996 | 3/1986 | European Pat. Off. . |
| 2 688 291 | 9/1993 | France . |
| 08326978 | 10/1996 | Japan . |
| 806986 | 1/1959 | United Kingdom . |
| WO 94/27080 | 11/1994 | WIPO . |

Primary Examiner—Kevin Lee
Attorney, Agent, or Firm—Anthony J. Casella; Gerald E. Hespos; Michael J. Porco

[57] ABSTRACT

The connector system comprises an upstream tubular body (1) capable of being connected to a pressurized-fluid line and in which there is placed a first shutter (18) bearing against a seat (6) under the action of a spring (20) upstream of the shutter. A downstream tubular body (2), that can be plugged into the upstream tubular body (1) and is capable of being connected to a line receiving the pressurized fluid, contains a second shutter (49) bearing against a seat (38) under the action of a spring (51) downstream of this shutter and of spring force equal to or less than that of the spring (20). A push-rod (24) and a tubular wall (25) which are fixed to the first shutter (18) downstream thereof interact with a push-rod (55) fixed to the second shutter (49) upstream thereof and with an upstream edge (57) of the downstream tubular body (2). The upstream tubular body (1) is mounted in a socket (29) provided with a counterbore (31) and with a catching groove (32). The downstream tubular body (2) is housed in a plug (60) capable of being introduced into the counterbore (31) and provided with elastic tabs (63) with teeth (64) for clipping into the catching groove (32). An operating ring (67) that can move along the plug (60) comprises openings (69) forming ramps for withdrawing the clip-in teeth (64) from the catching groove (32).

15 Claims, 6 Drawing Sheets

CONNECTOR SYSTEM

TECHNICAL FIELD

The subject of the present invention is a connector system for coupling a pressurized-fluid line to a line for receiving the said fluid, comprising an upstream tubular body capable of being connected to the pressurized-fluid line, a downstream tubular body that can be plugged into the upstream tubular body and is capable of being connected to the receiving line, and means for locking the downstream tubular body plugged into the upstream tubular body.

BACKGROUND ART

Connector systems of this type currently find many industrial applications and applications in the medical sector, particularly for medico-dental apparatus.

In these applications, it is desirable to be able to make and break the connection simply and quickly, with a minimum of precautions and manipulations.

Depending on the type of fluid used, leaks of fluid which occur on connection and disconnection may prove troublesome, for example for reasons of hygiene or safety. Further, when the connector system is intended for the hybrid connection of equipment calling upon fluid lines and electric lines, these leaks may constitute a serious hazard, both on connection and on disconnection, not to mention the fact that the connection elements touched by the leaks have to be cleaned or even reconditioned in order to be able to provide reliable re-connection.

DISCLOSURE OF THE INVENTION

The object of the present invention is to overcome these drawbacks. Its object is also to offer a connector system which is simple and easy to produce economically.

To this end, the connector system according to the invention is in accordance with the definitions given in the claims.

Thus, the connector system is characterized by a first shutter housed in the upstream tubular body and bearing against a seat thereof under the action of a first elastic stress upstream of this first shutter, a second shutter housed in the downstream tubular body and bearing against a seat thereof under the action of a second elastic stress downstream of this second shutter and at most equal to the first elastic stress, and first bearing means secured to the first shutter interacting with second bearing means secured to the second shutter and third bearing means secured to the downstream tubular body, so that when the tubular bodies are connected respectively to the pressurized-fluid line and to the receiving line, and when the downstream tubular body is plugged into the upstream tubular body, the second shutter then the first shutter are moved in turn off their respective seats, the former against the action of the second elastic stress and the latter against the action of the first elastic stress and of the pressurized fluid, and so that as the downstream tubular body is withdrawn from the upstream tubular body, the first shutter then the second shutter are allowed to return in turn against their respective seats, the former under the combined action of the first elastic stress and of the pressurized fluid, and the latter under the action of the second elastic stress.

In this way, the mere functions of plugging the downstream tubular body into the upstream tubular body and of withdrawing the said downstream tubular body from the upstream tubular body allow the second shutter to be opened before the first shutter and allow the first shutter to be closed before the second shutter. There is no overpressure on connection, while the disconnection movement provides a controlled discharge of the system and subsequent shutting-off thereof. The risks of leaks are eliminated. Variations in the pressure of the pressurized fluid have no effect on the controlled functioning of the system. The connector system thus fulfills its function for a vast range of pressures of pressurized fluid. Both connection and disconnection occur without sharp reactions on the upstream tubular body or on the downstream tubular body, and locking the plugged-in connection may be simplified. Any false move is impossible and the absence of leaks means that the system is particularly well-suited to the hybrid connection of fluid lines combined with the connection of electrical and/or optical-fibre conductors.

As a preference, and in a particularly simple embodiment, the first bearing means comprise a push-rod and a tubular wall fixed to the first shutter downstream thereof, the second bearing means comprise a push-rod fixed to the second shutter upstream thereof and capable of encountering the push-rod fixed to the first shutter, and the third bearing means consist of an upstream edge of the downstream tubular body capable of encountering the downstream tubular wall fixed to the first shutter, the relative arrangement of these bearing means being such that as the downstream tubular body is plugged into the upstream tubular body, the push-rod fixed to the second shutter first of all encounters the push-rod fixed to the first shutter, then the upstream edge of the downstream tubular body encounters the tubular wall fixed to the first shutter.

Alternatively, the first bearing means comprise a push-rod fixed to the first shutter downstream thereof, the second bearing means comprise a push-rod fixed to the second shutter upstream thereof and capable of encountering the push-rod fixed to the first shutter, and the third bearing means comprise a stop fixed in the downstream tubular body and capable of encountering the second shutter when it is moved off its seat.

In order to protect the functional control of the system from external attack, the push-rod fixed to the first shutter has a downstream and set back from a downstream edge of the upstream tubular body, and the push-rod fixed to the second shutter has an upstream end set back from an upstream edge of the downstream tubular body.

The assembly of the two tubular bodies will advantageously be sealed by an O-ring seal placed in the downstream end of the upstream tubular body interacting with an outer wall of the upstream end of the downstream tubular body.

To make the connector system extremely easy to use, one of the upstream and downstream tubular bodies is fixed into a socket provided with a counterbore surrounding the tubular body and in which a catching groove is formed, the other tubular body is fixed into a plug capable of being introduced into the counterbore and provided with elastic tabs with teeth for clipping into the catching groove, the introduction of the plug into the counterbore of the socket until the teeth clip into the catching groove determining the plugging of the downstream tubular body into the upstream tubular body.

The plug may comprise bearing means that can be moved in order to stress the elastic tabs against their elasticity to allow the clip-in teeth to be disengaged effortlessly from the catching groove and the plug to be separated from the socket and therefore the downstream tubular body to be withdrawn from the upstream tubular body. In this case, an operating ring will preferably be mounted so that it can move longitudinally along the plug, the moving bearing means being connected to this ring. Connection and disconnection of the connector system is therefore achieved by a simple push-pull operation on the operating ring. The downstream tubular body is locked plugged into the upstream tubular body with maximum rapidity and reliability, and manipulation remains extremely simple, even in a confined space.

An operating ring may also be mounted so that it can move longitudinally along the plug, the elastic tabs being connected to this ring. In this case, ramps secured to the plug may force the clip-in teeth of the elastic tabs into the catching groove in the socket.

These objects and other features and advantages of the invention are explained in the description which follows, given with reference to the appended drawings which depict, diagrammatically, and merely by way of example, two preferred but nonetheless illustrative embodiments of the invention.

MODES OF CARRYING OUT THE INVENTION

Figure 1:
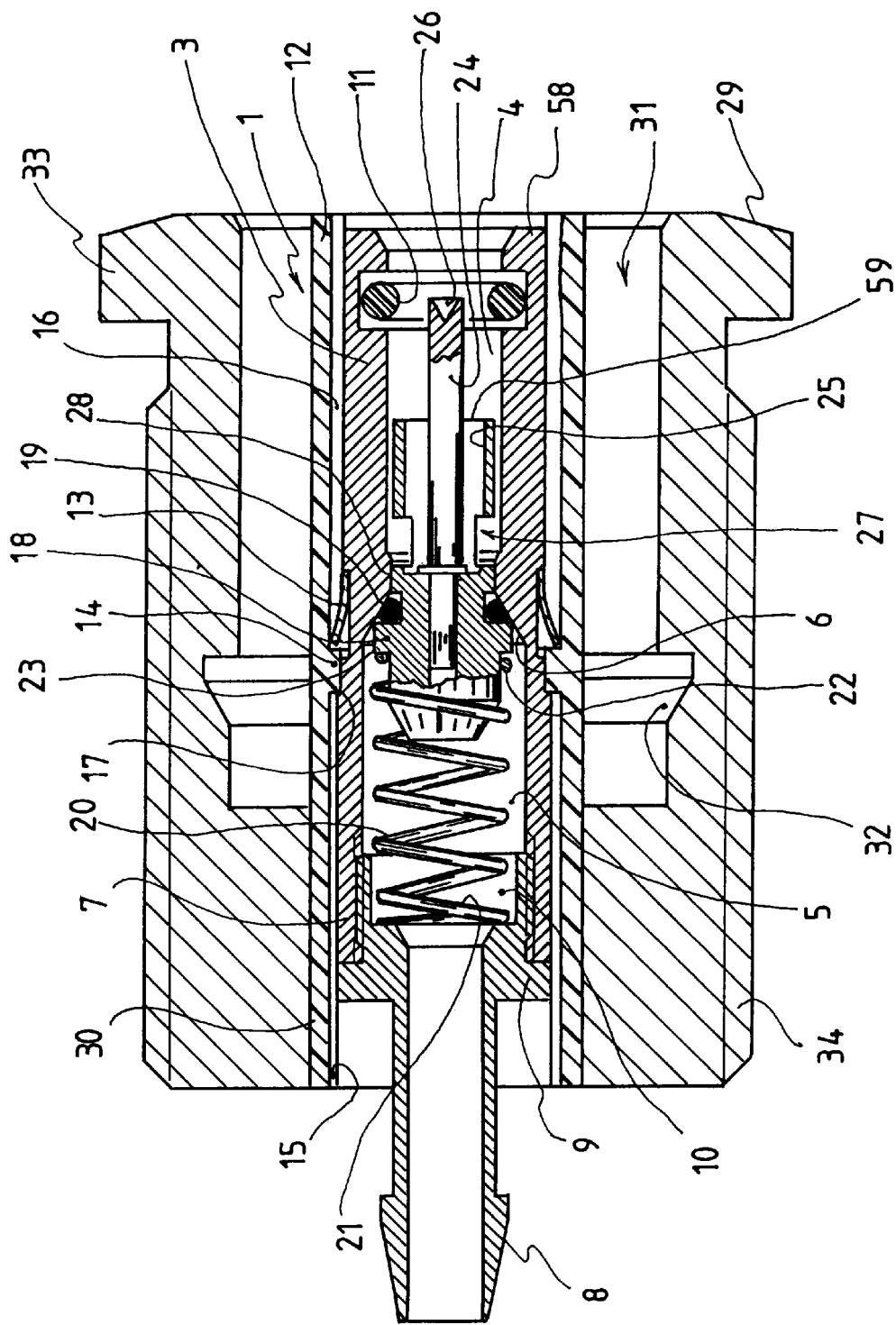
FIGS. 1 and 2 are two longitudinal sections through the elements that make up the first embodiment.
Figure 2:
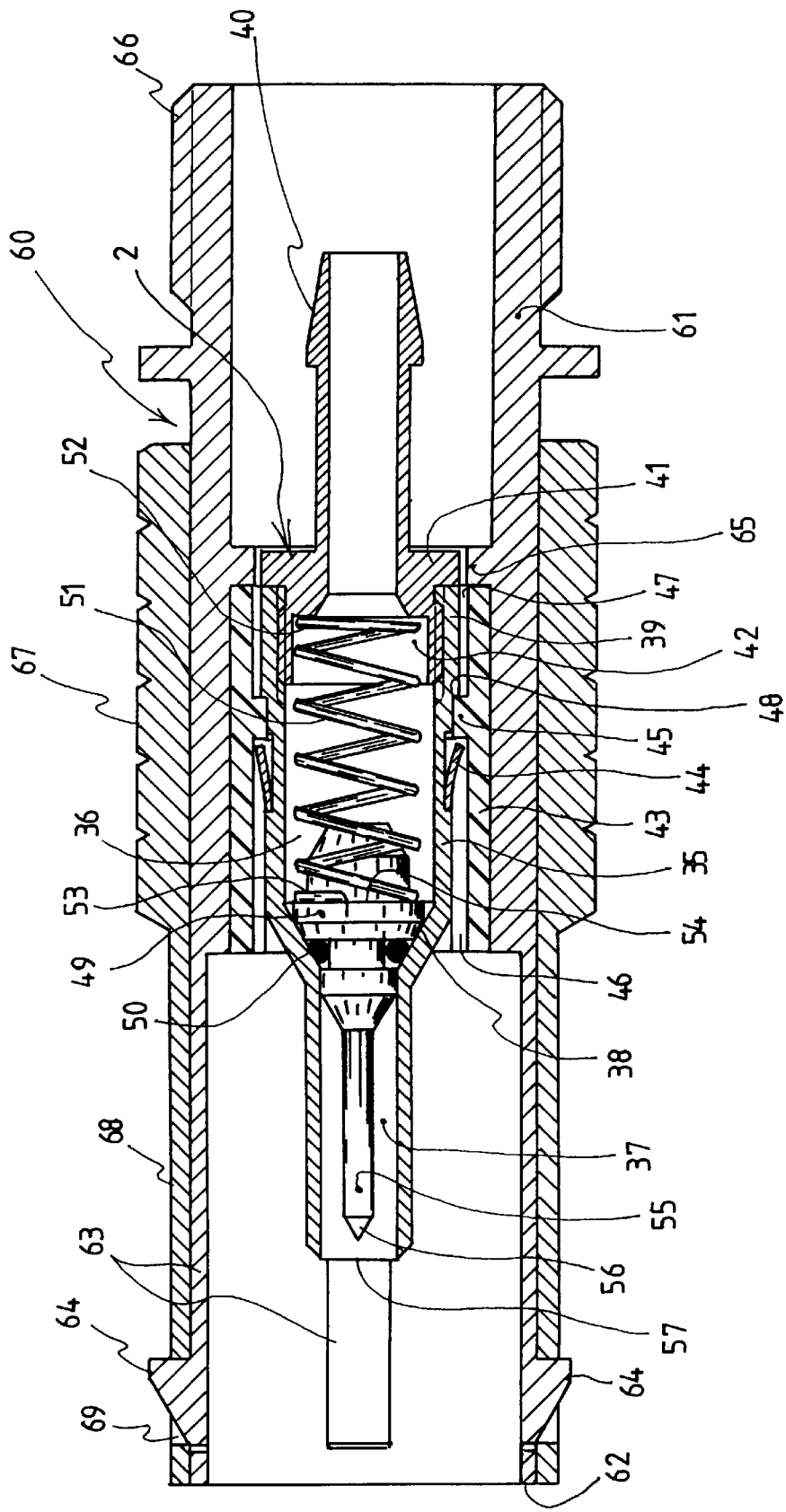

The connector system depicted in FIGS. 1 and 2 comprises an upstream tubular body 1 and a downstream tubular body 2 which is capable of being plugged into the upstream tubular body 1.

The upstream tubular body 1 (FIG. 1), comprises a main cylinder 3 comprising a downstream chamber 4 and an upstream chamber 5 between which an inclined shoulder forms a seat 6.

Screwed into the upstream end 7 of the chamber 5 is a union 8 for coupling to a pressurized-fluid line (not depicted), and the downstream end 9 of this union forms a cylindrical bearing cup 10. An O-ring seal 11 is placed in the downstream end of the downstream chamber 4.

The main cylinder 3 is fixed into a sleeve 12, for example made of insulating plastic. The main cylinder 3 is fixed into the sleeve 12 by a number of elastic tabs 13 fixed to the periphery of the main cylinder 3 and bearing against an internal shoulder 14 of the sleeve 12. Longitudinal grooves 15 and 16 formed inside the sleeve 12 allow the elastic tabs 13 to pass as the main cylinder 3 is plugged into the sleeve 12, and a counter-bearing shoulder 17 formed on the periphery of the main cylinder 3 facing the tabs 13 locks the shoulder 14 of the sleeve 12 between the tabs 13 and the counter-bearing shoulder 17.

A first shutter 18 fitted with an annular seal 19 is placed in the upstream chamber 5 of the main cylinder 3. The first shutter 18, which can move longitudinally in the upstream chamber 5, is brought to bear against the seat 6 via the seal 19 under the action of a first elastic stress which consists of a compression spring 20 placed upstream of the said shutter. An upstream end 21 of the spring 20 is housed in the cup 10 of the union 8 and a downstream end 22 of the said spring bears on a shoulder 23 of the shutter 18.

First bearing means secured to the first shutter 18 are formed by a push-rod 24 and a tubular wall 25 fixed downstream of the shutter 18 and extending into the downstream chamber 4 of the main cylinder 3. At its downstream end, the pushrod 24 has a bearing cone 26 and this end is set back from the downstream edge 58 of the downstream chamber 4 of the main body 3. The tubular wall 25 is provided with upstream transverse openings 27 and its outside diameter is such that it is able to slide against a cylindrical bearing surface 28 provided in the main cylinder 3, downstream of the seat 6, when the shutter 18 is moved against the action of the spring 20.

The upstream tubular body 1 is housed in a socket 29 in which it is fixed for example by bonding an upstream part 30 of the sleeve 12.

The socket 29 comprises a counterbore 31 surrounding the upstream tubular body 1 and in which a catching groove 32 is formed. The socket 29 has a bearing flange 33 and a peripheral screw-thread 34 by means of which features it can be fixed to a distribution board (not depicted).

The downstream tubular body 2 (FIG. 2) comprises a main cylinder 35 comprising a downstream chamber 36 and an upstream chamber 37 of an outside diameter such that it can be plugged into the downstream chamber 4 of the main cylinder 3 of the upstream tubular body 1 and bear against the O-ring seal 11 thereof. The join between the chambers 36 and 37 forms an inclined shoulder constituting a seat 38.

A union 40 for coupling to a line that receives the pressurized fluid (not depicted) is screwed into the downstream end 39 of the downstream chamber 36, and the upstream end 41 of this union 40 forms a cylindrical bearing cup 42.

The main cylinder 35 is fixed into a sleeve 43, for example made of insulating plastic. The main cylinder 35 is fixed into the sleeve 43 by elastic tabs 44 fixed to the periphery of the main cylinder 35 and bearing against an interior shoulder 45 of the sleeve 43. Longitudinal grooves 46 and 47 formed inside the sleeve 43 allow the elastic tabs 44 to pass as the main cylinder 35 is plugged into the sleeve 43, and a counter-bearing shoulder 48 formed on the periphery of the main cylinder 35 facing the elastic tabs 44 blocks the shoulder 45 of the sleeve 43 between the tabs 44 and the counter-bearing shoulder 48.

A second shutter 49 fitted with an annular seal 50 is placed in the downstream chamber 36 of the main cylinder 35. The second shutter 49, which can move longitudinally in the downstream chamber 36, is brought to bear against the seat 38 via the seal 50, under the action of a second elastic stress which consists of a compression spring 51 placed downstream of the shutter 49. A downstream end 52 of the spring 51 is housed in the cup 42 of the union 40 and an upstream end 53 of this spring bears on a shoulder 54 of the shutter 49. The spring 51 has a spring force equal to or lower than that of the spring 20 of the first shutter 18.

Second bearing means secured to the second shutter 49 are formed by a push-rod 55 fixed to the second shutter 49 upstream thereof and extending into the upstream chamber 37 of the main cylinder 35. The push-rod 55 has conical upstream end 56 and this end is set back from the upstream edge 57 of the upstream chamber 37 of the main cylinder 35. The push-rod 55 is capable of encountering the push-rod 24 of the first shutter 18 of the upstream tubular body 1.

Third bearing means secured to the downstream tubular body 2 consist of the upstream edge 57 of the upstream chamber 37 of the main cylinder 35. This upstream edge 57 is capable of encountering the downstream edge 59 of the tubular wall 25 fixed to the first shutter 18.

The relative arrangement of the push-rod 24 and of the tubular wall 25 which are secured to the first shutter 18, of the push-rod 55 of the second shutter 49, and of the upstream edge 57 of the main cylinder 35 is such that on plugging the downstream tubular body 2 into the upstream tubular body 1, the push-rod 55 first of all encounters the push-rod 24, then the upstream edge 57 encounters the downstream edge 59 of the tubular wall 25.

The downstream tubular body 2 is housed in a plug 60 which can be introduced into the counterbore 31 of the socket 29.

This plug 60 comprises a tubular body 61, the upstream end 62 of which is cut to form elastic tabs 63 each of which ends in a clip-in tooth 64. In this instance there are four elastic tabs 63, and the clip-in teeth 64 are capable of catching in the catching groove 32 of the socket 29.

The downstream tubular body 2 is fixed into the tubular body 61, for example by bonding the sleeve 43 bearing against an internal shoulder 65 of the body 61.

At the downstream end of the tubular body 61 there is a screw-thread 66 for attaching a fitting (not depicted) for clamping the line (not depicted) that receives the pressurized fluid.

An operating ring 67 provided with a sleeve 68 pierced with transverse openings 69 arranged over the clip-in teeth 64 and thus forming moving bearing surfaces capable of stressing the clip-in teeth 64 and therefore the elastic tabs 63 against their elasticity and towards the inside of the tubular body 61 is slipped over the tubular body 61 of the plug 60.

The arrangement of the upstream tubular body 1 in the socket 29 and of the downstream tubular body 2 in the plug 60 is such that introducing the plug 60 into the socket 29 until the clip-in teeth 64 engage in the catching groove 32 determines the plugging of the downstream tubular body 2 into the upstream tubular body 1.

Figure 3:
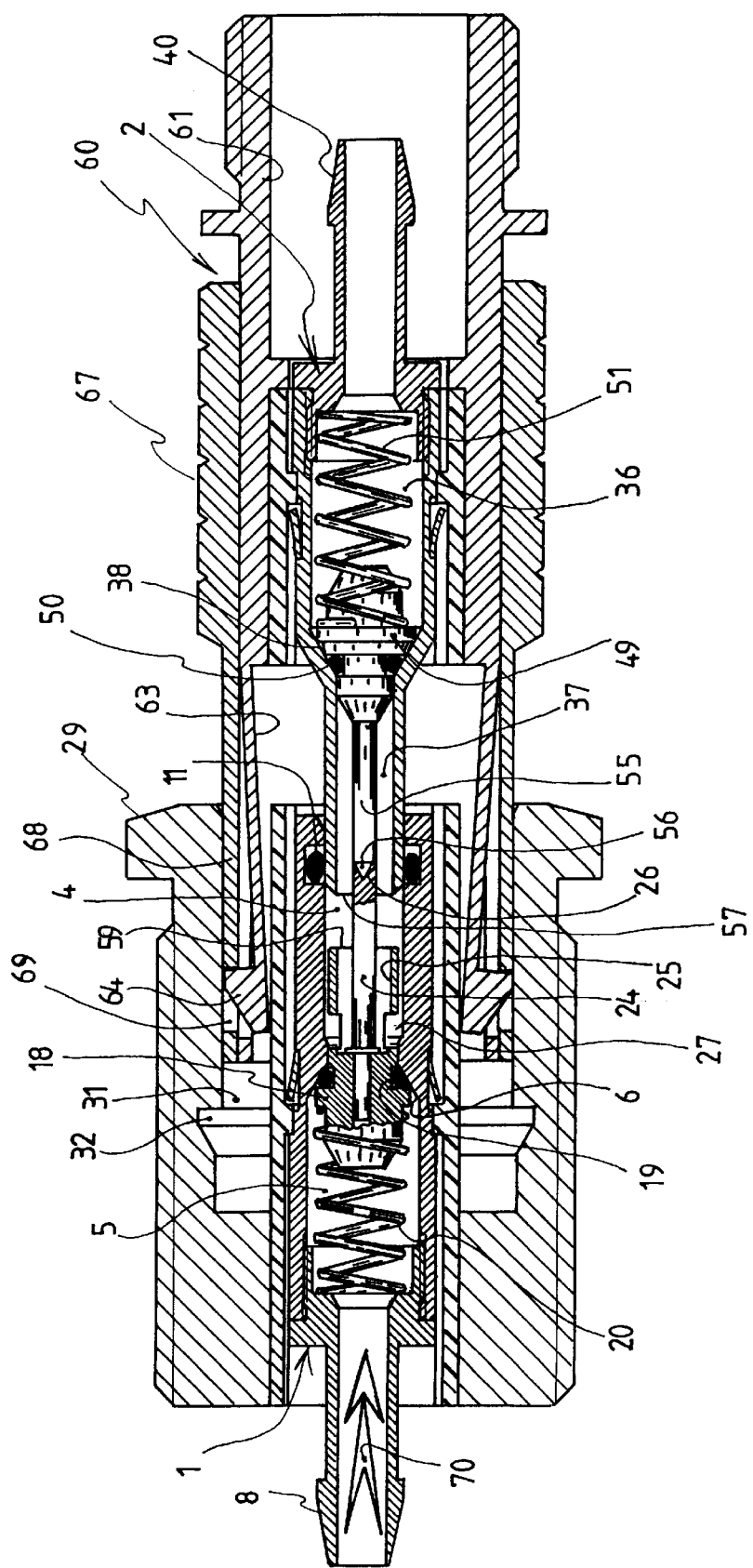
FIGS. 3, 4 and 5 are longitudinal sections illustrating the functioning of this first embodiment.
Figure 4:
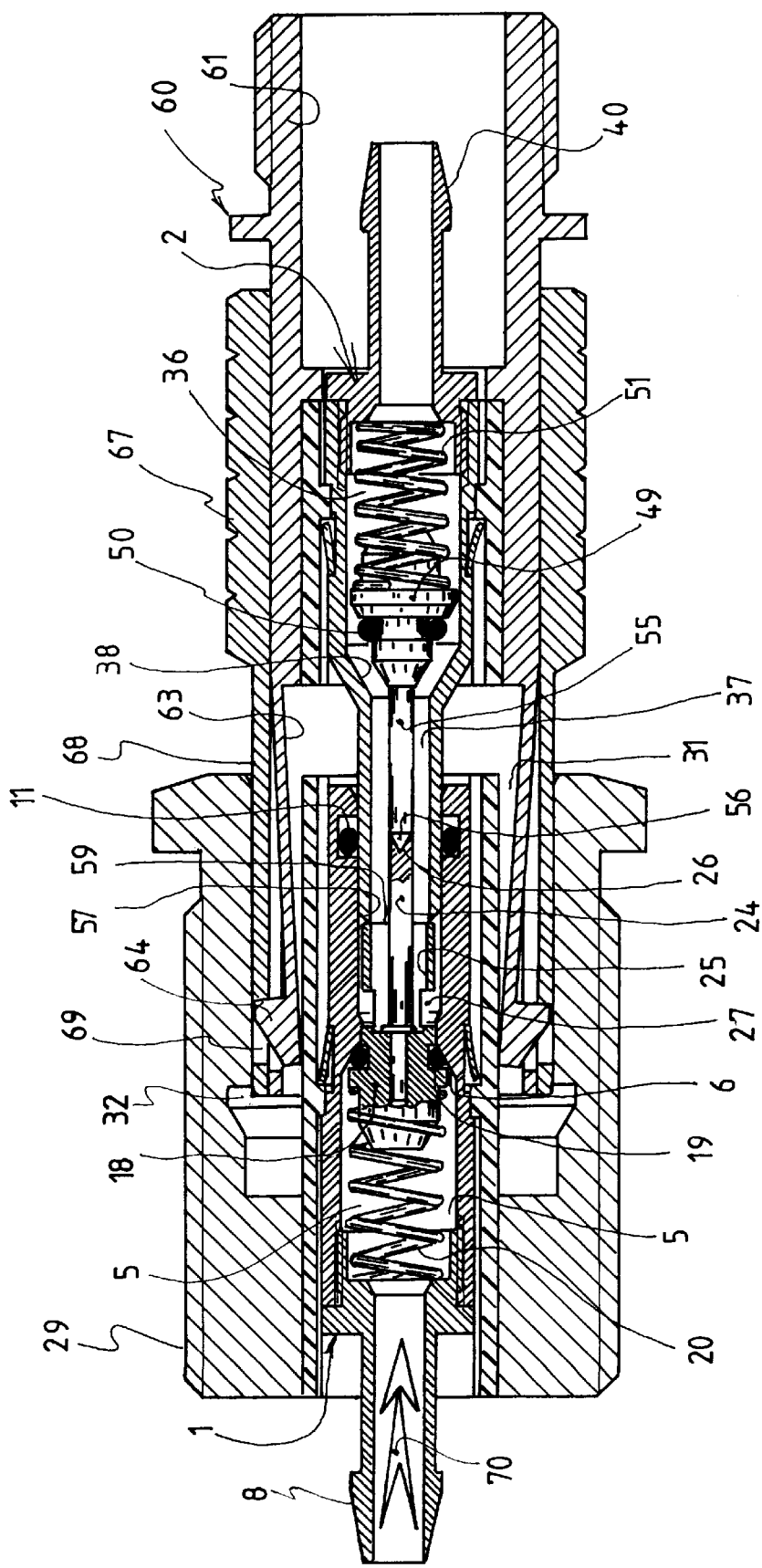
Figure 5:
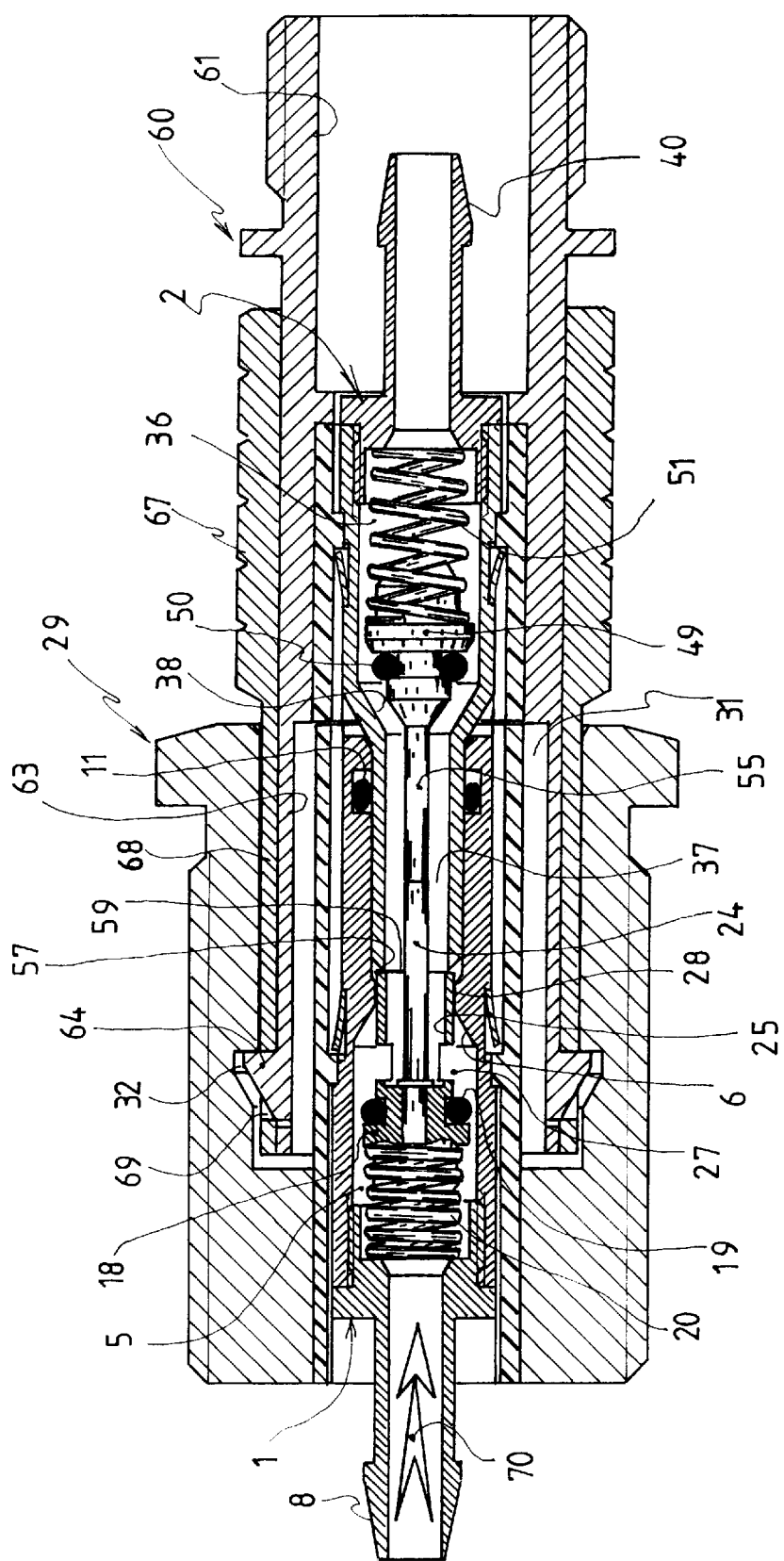

The way in which the connector system described works is illustrated in FIGS. 3, 4 and 5.

The upstream tubular body 1 is assumed to be connected by its union 8 to the pressurized-fluid line (not depicted) and the downstream tubular body 2 is assumed to be connected by its union 40 to the line (not depicted) that receives the said fluid. The direction of flow of the pressurized fluid is depicted by the arrow 70.

As the plug 60 is introduced into the socket 29 by pushing axially on the operating ring 67 (FIG. 3), the clip-in teeth 64 are pushed back by the wall of the counterbore 31 towards the inside of the tubular body 61 against the elasticity of the elastic tabs 63. At the same time, the upstream chamber 37 of the downstream tubular body 2 plugs into the downstream chamber 4 of the upstream tubular body 1 and its wall crushes the O-ring seal 11, sealing the join between the tubular bodies 1 and 2. The push-rod 55 of the second stopper 49 comes into contact with the push-rod 24 of the first shutter 18, the conical end 56 penetrating the bearing cone 26. At this stage, the first shutter 18 is bearing via its seal 19 against the seat 6 under the combined action of the spring 20 and of the pressure of the pressurized fluid acting in the upstream chamber 5 in the direction of the arrow 70. The second shutter 49 is also resting via its seal 50 against the seat 38 under the action of the spring 51.

As the plug 60 continues to be introduced into the socket 29 (FIG. 4), the pushrod 24 of the first shutter 18 pushes back the push-rod 55 of the second shutter 49, because the springs 20 and 51 have equal spring force whereas the first shutter 18 is experiencing the thrust of the pressurized fluid in the direction of the arrow 70 in addition to that of the spring 20. The second shutter 49 is thus moved off the seat 38. The upstream edge 57 of the upstream chamber 37 of the downstream tubular body 2 then comes into contact with the downstream edge 59 of the tubular wall 25 of the first shutter 18.

As the plug 60 continues to be introduced into the socket 29 until the clip-in teeth 64 engage in the catching groove 32 under the elastic action of the elastic tabs 63 (FIG. 5), the upstream edge 57 of the downstream tubular body 2 pushes back the downstream edge 59 of the tubular wall 25 of the first shutter 18 against the combined action of the spring 20 and of the pressure of the pressurized fluid in the direction of arrow 70. The tubular wall 25 slides along the cylindrical bearing surface 28 of the upstream tubular body 1, while the first shutter 18 is moved off the seat 6 against the action of the spring 20 and of the pressurized fluid. The pressurized fluid can then pass from the upstream chamber 5 of the upstream tubular body 1 through the tubular wall 25 via the openings 27, along the upstream chamber 37 of the downstream tubular body 2, then through the downstream chamber 36 and the union 40 in order to reach the receiving line (not depicted).

To uncouple the pressurized-fluid line from the receiving line, all that is required is for the operating ring 67 to be pulled in the opposite direction to the axial thrust used to introduce the plug 60 into the socket 29 so that the openings 69 of the sleeve 68 by a wedge effect push the clip-in teeth 64 towards the inside of the tubular body 61. The clip-in teeth 64 thus disengage from the catching groove 32 and the plug 60 can be withdrawn from the socket 29, the withdrawal of the plug leading to the withdrawal of the downstream tubular body 2 from the upstream tubular body 1.

During this withdrawal, the upstream edge 57 frees the downstream edge 59, and this allows the first shutter 18 to return to bearing via its seal 19 against the seat 6 under the combined action of the spring 20 and of the pressure of the pressurized fluid in the direction of arrow 70, while the second shutter 49 is kept off the seat 38, first of all by the pressure of the fluid and by the thrust of the push-rod 24 against the push-rod 55, then merely by the thrust of the push-rod 24 against the push-rod 55. When withdrawal continues after the first shutter 18 has closed, the push-rod 55 of the second shutter 49 is freed and the second shutter can return to bear via its seal 50 against the seat 38 under the action of the spring 51.

Figure 6:
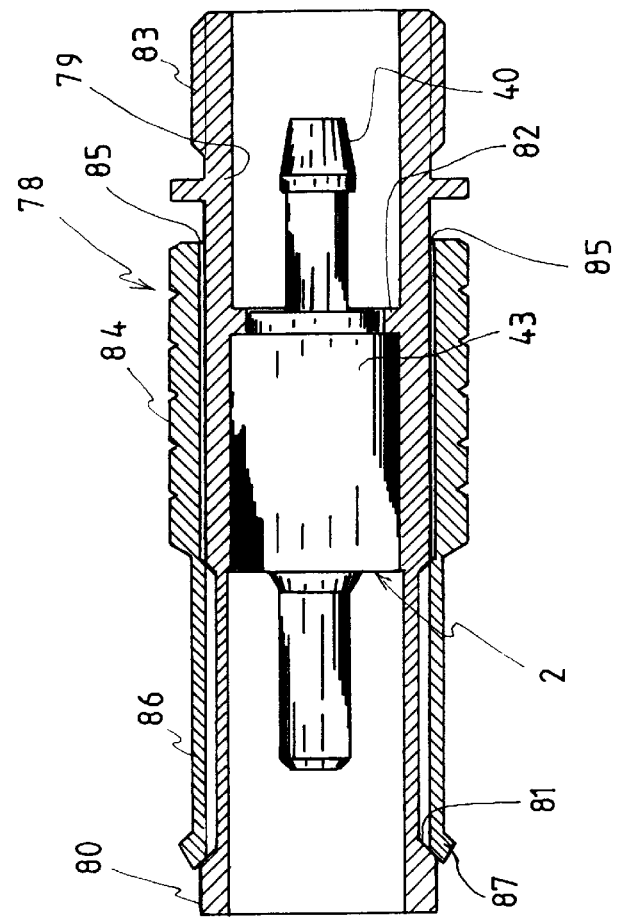
FIGS. 6 and 7 are two longitudinal sections through the elements which make up the second embodiment.
Figure 7:
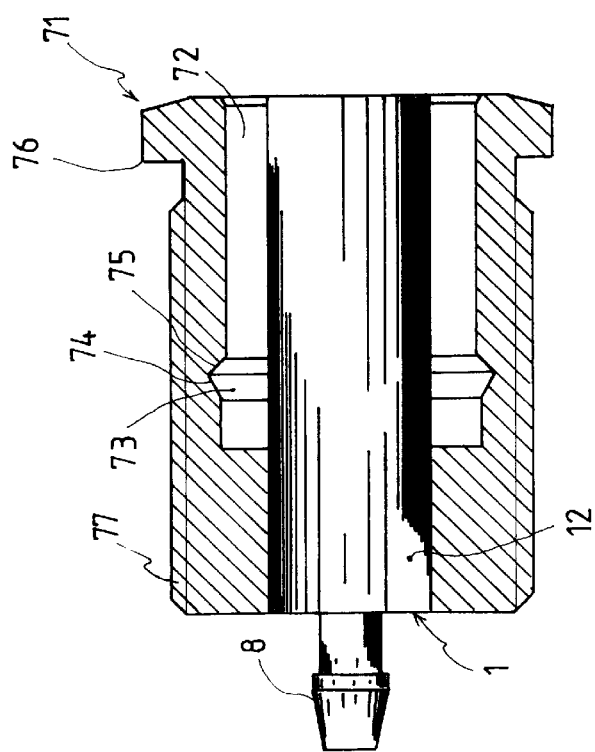

The second embodiment of the connector system, which is depicted in FIGS. 6 and 7, is identical to the first embodiment as far as the upstream tubular body 1 and the downstream tubular body 2 are concerned, and reference is made to the above description.

The upstream tubular body 1 in this instance is housed in a socket 71 in which it is also fixed by bonding an upstream part of its sleeve 12. The socket 71 comprises a counterbore 72 surrounding the tubular body 1 and in which there is formed a catching groove 73 with walls 74 and 75 inclined towards one another. Like the socket of the first embodiment, the socket 71 comprises a bearing flange 76 and a peripheral screw-thread 77, by means of which features it can be fixed to a distribution board (not depicted).

The downstream tubular body in this instance is housed in a plug 78 capable of being introduced into the counter-bore 72 of the socket 71. This socket comprises a tubular body 79, the upstream end 80 of which bears two ramped rims 81 pointing towards the inside of the tubular body 79. The downstream tubular body 2 is also fixed into the tubular body 79, for example by bonding of its sleeve 43 bearing against a shoulder 82 of the body 79.

At the downstream end of the tubular body 79 there is a screw-thread 83 for attaching a fitting (not depicted) for clamping the line (not depicted) that receives the pressurized fluid.

An operating ring 84 provided with internal longitudinal grooves 85 allowing it to be mounted over the ramped rims 81 is slipped over the tubular body 79. The operating ring 84 is provided with elastic tabs 86 with clip-in teeth 87 of a shape that corresponds to the cross-section of the catching groove 73 in the socket 71.

The way in which this second embodiment works is essentially the same as in the first embodiment of FIGS. 1 to 5. There is, however, a difference in the fact that on uncoupling, the pulling on the operating ring 84 causes the clip-in teeth 87 to slide along the inclined wall 75 of the catching groove 73, and this allows the teeth to disengage so that the plug can be withdrawn. Furthermore, in the event of pulling on the tubular body 79 while the plug is coupled to the socket, the ramped rims 81 force the clip-in teeth 87 into the catching groove 73.

Alternatives are foreseeable without departing from the scope of the invention.

Thus, for example, the compression springs 20 and 51 could be replaced by leaf springs arranged in the main cylinders 3 and 35.

Furthermore, the first, second and third bearing means may differ in that the first bearing means may comprise just one push-rod 24 fixed to the first shutter 18, the second bearing means comprising the push-rod 55 fixed to the second shutter 49 like in the embodiment described and capable of encountering the single push-rod 24 fixed to the first shutter 18, and the third bearing means comprising a stop fixed in the downstream chamber 36 of the main cylinder 35 of the downstream tubular body 2 and capable of encountering the second shutter 49 when it is moved off the seat 38. This stop thus acts as a downstream wall 57 of the downstream tubular body 2 because it blocks the second shutter 49 which can then push the first shutter 18 back via the push-rod 55 acting on the push-rod 24 of the first shutter.

Although the invention has been depicted in the context of the coupling of a single pressurized-fluid line to a single receiving line, it is clearly understood that it is also applicable to the simultaneous coupling of a number of pressurized-fluid lines to a corresponding number of receiving lines and therefore of a number of upstream and downstream tubular bodies, if necessary in parallel with one or more electric and/or optical fibre lines arranged in a single socket/plug group as described hereinabove.

Finally, the socket 29 or 71 may be produced for use without being fixed to a distribution board, just as the socket may be secured to the downstream tubular body while the plug is secured to the upstream tubular body.

Other systems for locking the downstream tubular body plugged into the upstream tubular body may also be used, for example a mobile clamp secured to one of the socket or plug elements and interacting with a bearing surface or retaining groove secured to the other element—plug or socket; in this case, the elements, plug and socket, could even be dispensed with, the clamp and the bearing surface or the groove being secured directly to the upstream and downstream tubular bodies respectively.

What is claimed is:

1. Connector system for coupling a pressurized-fluid line that accommodates a flow of pressurized fluid to a receiving line for receiving said fluid, comprising an upstream tubular body (1) capable of being connected to the pressurized-fluid line, a downstream tubular body (2) that can be plugged into the upstream tubular body and is capable of being connected to the receiving line, and means (29, 60, 71, 78) for locking the downstream tubular body plugged into the upstream tubular body, characterized by a first shutter (18) housed in the upstream tubular body (1) and bearing against a seat (6) thereof under the action of a first elastic stress (20) upstream of the first shutter, a second shutter (49) housed in the downstream tubular body (2) and bearing against a seat (38) thereof under the action of a second elastic stress, and first bearing means (24, 25) secured to the first shutter (18) interacting with second bearing means (55) secured to the second shutter (49) and third bearing means (57) secured to the downstream tubular body (2), so that when the tubular bodies (1, 2) are connected respectively to the pressurized-fluid line and to the receiving line, and when the downstream tubular body (2) is plugged into the upstream tubular body (1), the second shutter (49) then the first shutter (18) are moved in turn of their respective seats, the second shutter (49) being moved against the action off the second elastic stress (51) and the first shutter (18) being moved against the action of the first elastic stress (20) and of the pressurized fluid, and so that as the downstream tubular body (2) is withdrawn from the upstream tubular body (1), the first shutter (18) then the second shutter (49) are allowed to return in turn against their respective seats, the first shutter (18) under the combined action of the first elastic stress (20) and of the pressurized fluid, and the second shutter (49) under the action of the second elastic stress (51).

2. Connector system according to claim 1, in which the first bearing means comprise a push-rod (24) and a tubular wall (25) fixed to the first shutter (18) downstream thereof, the second bearing means comprise a push-rod (55) fixed to the second shutter (49) upstream thereof and capable of encountering the pushrod (24) fixed to the first shutter (18), and the third bearing means consist of an upstream edge (57) of the downstream tubular body (2) capable of encountering the tubular wall (25) fixed to the first shutter (18), the relative arrangement of these bearing means being such that as the downstream tubular body (2) is plugged into the upstream tubular body (1), the push-rod (55) fixed to the second shutter (49) first of all encounters the push-rod (24) fixed to the first shutter (18), then the upstream edge (57) of the downstream tubular body (2) encounters the tubular wall (25) fixed to the first shutter (18).

3. Connector system according to claim 1, in which the first bearing means comprise a push-rod (24) fixed to the first shutter (18) downstream thereof, the second bearing means comprise a push-rod (55) fixed to the second shutter (49) upstream thereof and capable of encountering the push-rod fixed to the first shutter, and the third bearing means comprise a stop fixed in the downstream tubular body (2) and capable of encountering the second shutter (49) when it is moved off its seat.

4. Connector system according to claim 3, in which the pushrod (24) fixed to the first shutter (18) has a downstream end (26) set back from a downstream edge (58) of the upstream tubular body (1), and the push-rod (55) fixed to the second shutter (49) has an upstream end (56) set back from an upstream edge (57) of the downstream tubular body (2).

5. Connector system according to claim 4, in which an O-ring seal (11) placed in the downstream end (4) of the upstream tubular body (1) interacts with an outer wall of the upstream end (37) of the downstream tubular body (2).

6. Connector system according to claim 5, in which one of the upstream and downstream tubular bodies (1, 2) is fixed into a socket (29, 71) provided with a counterbore (31, 72) surrounding the tubular body (1, 2) and in which a catching groove (32, 73) is formed, the other tubular body (1, 2) is fixed into a plug (60, 78) capable of being introduced into the counterbore (31, 72) and provided with elastic tabs (63, 86) with teeth (64, 87) for clipping into the catching groove, the introduction of the plug into the counterbore of the socket until the teeth clip into the catching groove determining the plugging of the downstream tubular body (2) into the upstream tubular body (1).

7. Connector system according to claim 6, in which the plug (60) comprises bearing means (69) that can be moved in order to stress stressing the elastic tabs (63) against their elasticity.

8. Connector system according to claim 7, in which an operating ring (67) is mounted so that it can move longitudinally along the plug (60), the moving bearing means (69) being connected to this ring (67).

9. Connector system according to claim 6, in which an operating ring (84) is mounted so that it can move longitudinally along the plug (78), the elastic tabs (86) being connected to this ring (84).

10. Connector system according to claim 9, in which ramps (81) secured to the plug (78) force the clip-in teeth (87) of the elastic tabs (86) into the catching groove (73) in the socket (71).

11. Connector system according to claim 2, in which the push-rod (24) fixed to the first shutter (18) has a downstream end (26) set back from a downstream edge (58) of the upstream tubular body (1), and the push-rod (55) fixed to the second shutter (49) has an upstream end (56) set back from an upstream edge (57) of the downstream tubular body (2).

12. Connector system according to claim 11, in which an O-ring seal (11) placed in the downstream end (4) of the upstream tubular body (1) interacts with an outer wall of the upstream end (37) of the downstream tubular body (2).

13. Connector system according to claim 12, in which one of the upstream and downstream tubular bodies (1, 2) is fixed into a socket (29, 71) provided with a counterbore (31, 72) surrounding the tubular body (1, 2) and in which a catching groove (32, 73) is formed, the other tubular body (1, 2) is fixed into a plug (60, 78) capable of being introduced into the counterbore (31, 72) and provided with elastic tabs (63, 86) with teeth (64, 87) for clipping into the catching groove, the introduction of the plug into the counterbore of the socket until the teeth clip into the catching groove determining the plugging of the downstream tubular body (2) into the upstream tubular body (1).

14. Connector system according to claim 1, in which an O-ring seal (11) placed in the downstream end (4) of the upstream tubular body (1) interacts with an outer wall of the upstream end (37) of the downstream tubular body (2).

15. Connector system according to claim 1, in which one of the upstream and downstream tubular bodies (1, 2) is fixed into a socket (29, 71) provided with a counterbore (31, 72) surrounding the tubular body (1, 2) and in which a catching groove (32, 73) is formed, the other tubular body (1, 2) is fixed into a plug (60, 78) capable of being introduced into the counterbore (31, 72) and provided with elastic tabs (63, 86) with teeth (64, 87) for clipping into the catching groove, the introduction of the plug into the counterbore of the socket until the teeth clip into the catching groove determining the plugging of the downstream tubular body (2) into the upstream tubular body (1).

\* \* \* \* \*

UNITED STATES PATENT AND TRADEMARK OFFICE
CERTIFICATE OF CORRECTION

PATENT NO. : 6,161,579      Page 1 of 1
DATED : December 19, 2000
INVENTOR(S) : Francois Vulliet It is certified that error appears in the above-identified patent and that said Letters Patent is hereby corrected as shown below:

<u>Title page,</u>
Below item [22], insert the following:

[22] PCT Filed: July 3, 1998

[86] PCT No.: PCT/EP98/04113
     Sec. 371 Date: Dec. 29, 1999
     Sec. 102(e) Date: Dec. 29, 1999

[87] PCT Pub. No.: WO 99/04191
     PCT Pub. Date: Feb. 10, 1999

[30] Foreign Application Proority Data
     July 17, 1997 -[EP] European Patent Office EP 97 11 2309

Signed and Sealed this

Twenty-third Day of October, 2001

Attest:

*Nicholas P. Godici*

NICHOLAS P. GODICI
*Attesting Officer*      *Acting Director of the United States Patent and Trademark Office*